United States Patent

Sato

[11] Patent Number: 5,562,134
[45] Date of Patent: Oct. 8, 1996

[54] WOODWORKING MACHINE

[75] Inventor: Hiromi Sato, Ashina-gun, Japan

[73] Assignee: Kitagawa Kogyo Co., Ltd., Hiroshima, Japan

[21] Appl. No.: 304,672

[22] Filed: Sep. 12, 1994

[51] Int. Cl.[6] ............... B27B 1/00; B23C 1/16; B23C 5/00
[52] U.S. Cl. .................. 142/9; 142/16; 142/26; 144/356; 144/365; 144/145.2; 364/474.02
[58] Field of Search ............... 82/1.11, 12, 158; 142/7, 8, 9, 42, 49, 56, 11, 3, 16, 26; 144/1 R, 1 A, 2 R, 47, 144 R, 365, 356, 357, 145 R, 145 A; 409/80, 84, 93, 99; 364/474.02, 474.03, 474.24

[56] References Cited

U.S. PATENT DOCUMENTS

| | | | |
|---|---|---|---|
| 527,152 | 10/1894 | Maybeck | 142/9 X |
| 3,960,188 | 6/1976 | Schmidt | 144/144 R X |
| 4,512,380 | 4/1985 | Schmidt | 144/1 A |
| 5,224,529 | 7/1993 | Kenny | 142/42 |
| 5,454,422 | 10/1995 | Kitagawa | 144/1 A |

*Primary Examiner*—W. Donald Bray

[57] ABSTRACT

Woodworking machines which can hold works in tilted positions thereby to render possible the suitable working of cave portion in said works. The woodworking machine according to the invention has a swiveling table 2 carrying a plurality of rotating jigs 4 in parallel relation to each other and a tailstock 3 carrying holders 5 corresponding to said jigs 4 for holding respective works between said holders 5 and said jigs 4, said swiveling table 2 and said tailstock 3 being located on the upper surface of a base plate 8, wherein said holders 5 are located on said tailstock 3 which can be vertically shifted according to the invention, thereby to hold said works 1 in their tilted positions.

4 Claims, 5 Drawing Sheets

Fig. 8 - PRIOR ART

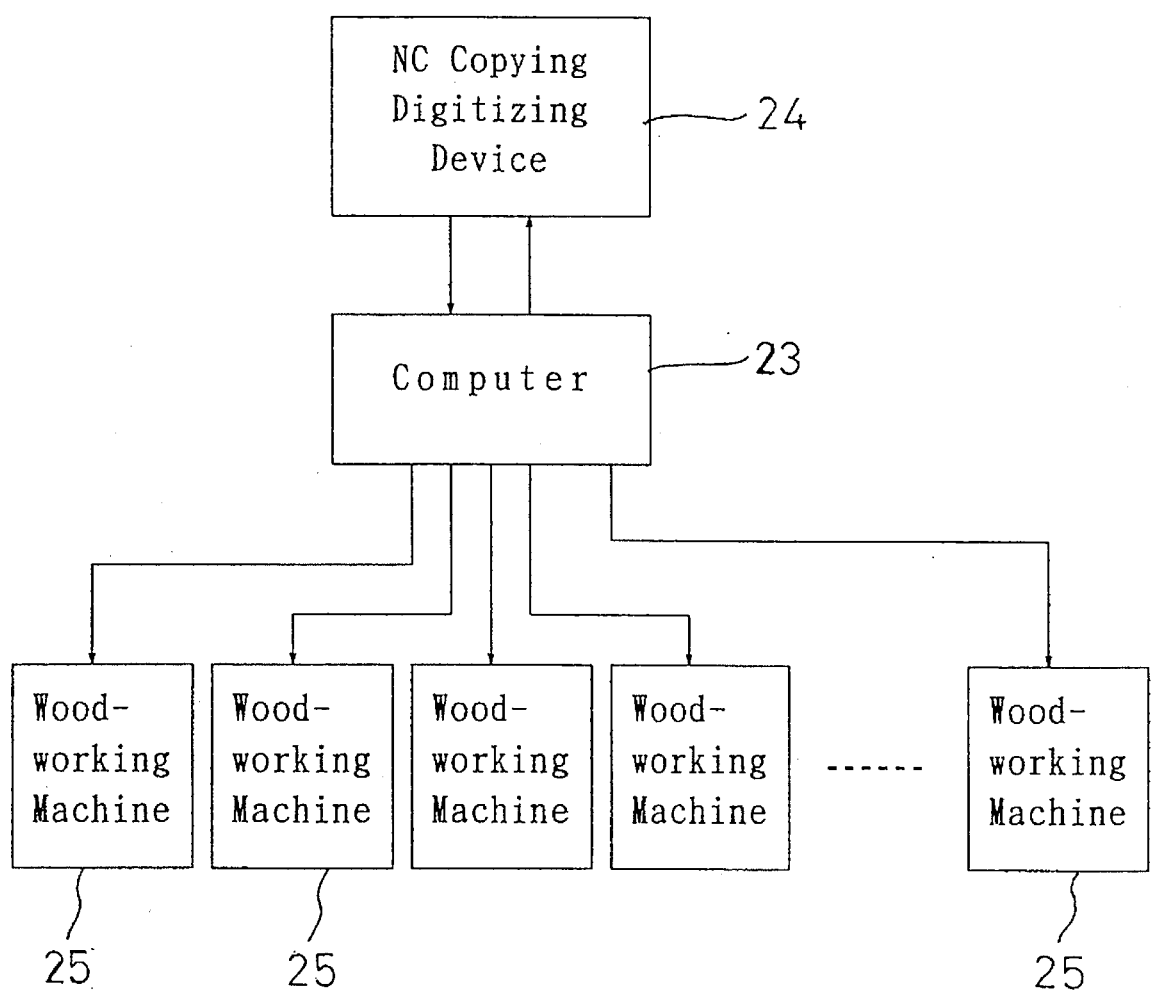

WOODWORKING MACHINE

BACKGROUND OF THE INVENTION:

1. Field of the Invention

This invention relates to woodworking machines, more specifically woodworking machines for carrying out automatic working of wooden works based upon preformed digitizing data.

2. Description of the Prior Art

A plurality of woodworking machines for working works into desired three-dimensional form have been well known. In such woodworking machines, a model having a desired form is manually copied by means of a copying head, while at the same time a plurality of works are simultaneously worked into the same form as said model by means of a plurality of working heads driven in synchronous manner with said model copying head.

More recently, in place of these manual copying apparatuses, there have been developed and used various woodworking machines for automatically working on the basis of copying digitizing data compiled by CAD and the like.

As shown in FIG. 8 which shows a portion of said conventional woodworking machine, the edge portions of a work 1 are held respectively by a swiveling table 2 and a tailstock 3 located so as to oppose each other, these swiveling table 2 and tailstock 3 being shifted along a determined guide member in the axial direction (X direction) of said work. Further, a plurality of rotary jigs 4 driven by a not-shown driving apparatus are located in parallel relation to each other on one side surface of said swiveling table 2, whilst respective work-holders 5 for holding said work 1 against said jigs 4 while urging said work 1 towards said jigs 4 are located on the side surface of said tailstock 3 at the points corresponding respectively to said jigs 4. Further, respective cutting tools which can be shifted in the lateral direction (Y direction) and in the vertical direction (Z direction) are located above the positions corresponding to respective works 1 to be worked between said swiveling table 2 and said tailstock 3. And each of these cutting tools 6 has at its point a detachable cutting blade 7.

In such conventional woodworking machines, while said work 1 is rotatably driven by said jigs 4, said work 1 is shifted in X direction and at the same time said cutting tool 6 is shifted in Y direction and in Z direction on the basis of copying digitizing data memorized in a computer and the like, thereby to work said work 1 into a desired shape.

However, since said conventional woodworking machines show a predetermined and constant axis of rotation of said work 1 by means of jigs 4, the conventional type of machines have the disadvantage that, when the cutting shape in said work 1 is a cave having an overhang as shown in FIG. 8, the cutting blade 7 of said cutting tool 6 can not reach the interior portion of the cave only through the sifts in X, Y, Z directions of said work 1 and said cutting tool 6 so that cutting of such cave can not be achieved.

For achieving this objective, it is advantageous to tilt the rotational axis of said jigs 4, but in the case of such a tilting axis of jigs 4, the rigidity around the axis of jigs 4 is considerably reduced with a complicated construction of device and with a higher manufacturing cost thereof.

SUMMARY OF THE INVENTION

For eliminating the above disadvantages, it is the main object of this invention to deliver such type of woodworking machines which can hold the work in tilting positions thereby to suitably work even the cave form.

For achieving the object described above, there is provided according to the invention a woodworking machine, having a swiveling table carrying a plurality of rotating jigs in parallel relation to each other and a tailstock carrying holders corresponding to said jigs for holding respective works between said holders and said jigs, said swiveling table and said tailstock being located on the upper surface of a base plate, and having cutting tools above the positions corresponding to said respective works, wherein said works are each worked into predetermined three-dimensional form through shifting of said swiveling table in the axial direction of said respective works and through shifting of said cutting tools in the vertical and lateral directions, said woodworking machines being characterized as claimed in claim 1 in that said holders carried by said tailstock are capable of vertical shifting.

Further, according to the invention as claimed in claim 2, the woodworking machine is characterized in that vertically shifting or elevating tables are located in said tailstock, and said holders are carried by said vertically shifting or elevating tables.

In the woodworking machines according to the invention constructed as described above, said works can be held in tilted positions by holding said respective works between said jigs of said swiveling table and said holders of said tailstock and by vertically shifting said elevating table. Thus, said works are worked by said cutting tools through rotating said jigs of said swiveling table while moving said swiveling table there- by to drive said work in axial direction and driving said cutting tools in vertical and lateral directions, and if necessary through vertically shifting said holders of said tailstock thereby to tilt said works. In such a tiling positions of said works, said cutting tools can reach the interior portion of a cave to be worked in said works, so that a suitable working of cave can be achieved.

BRIEF DESCRIPTION OF THE DRAWINGS

FIG. 7 is a block diagram of controlling mechanism for woodworking machines according to the invention, FIG. 8 a diagram showing a portion of a conventional woodworking machines.

DETAILED DESCRIPTION OF THE EMBODIMENTS

An embodiment of the woodworking machines according to the invention is described hereinbelow referring to the attached drawings, FIG. 1–FIG. 7.

Figure 1:
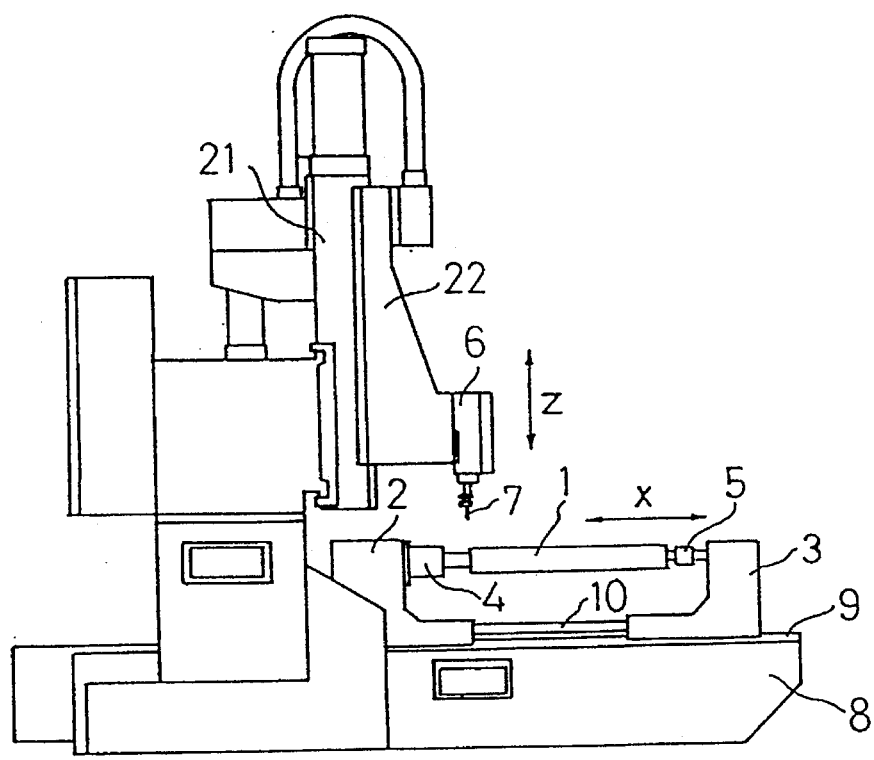
FIG. 1 is a side view of an embodiment of woodworking machine according to the invention, FIG. 2 a front view of the woodworking machine shown in FIG. 1, FIG. 3 in an enlarged view of swiveling table shown in FIG. 1.
Figure 3:
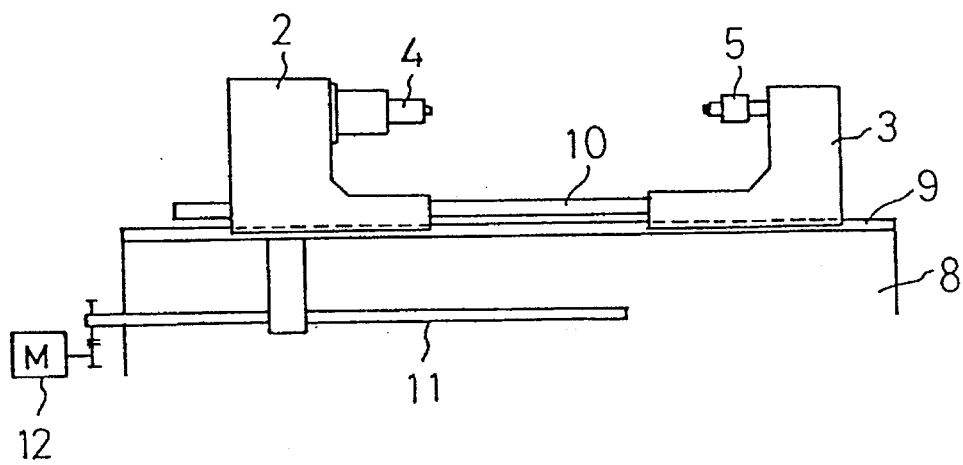
Figure 2:
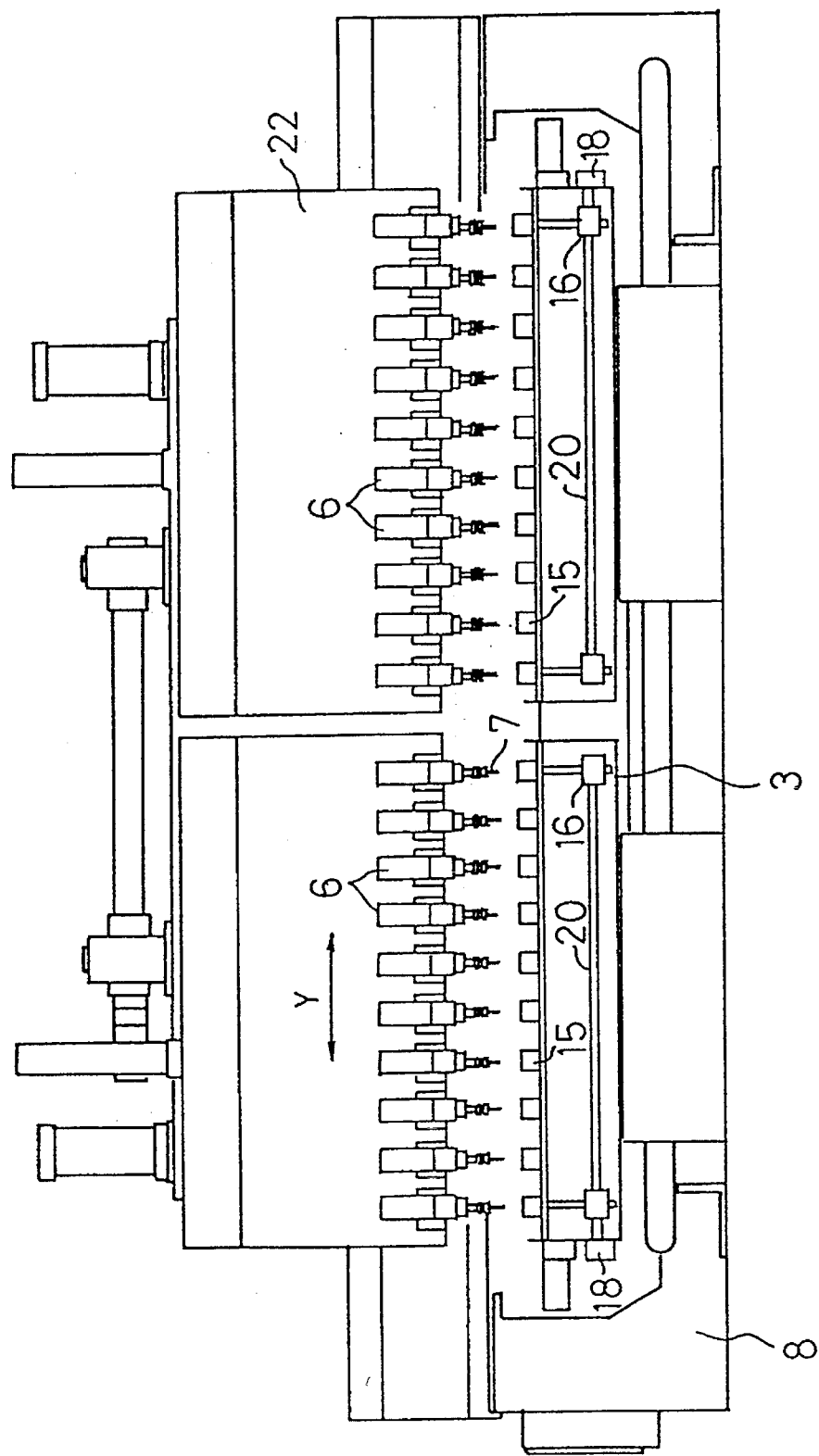

The woodworking machine shown in FIGS. 1–3 has a base plate 8, on the upper side surface of which a swiveling table 2 is carried so as to shift along a guide rail 9. A plurality (20 in this embodiment) of rotating jigs 4,4 . . . are carried on one side surface of said swiveling table 2 in parallel relation to each other and are driven by means of a not-shown driving means.

A tailstock 3 is carried on said upper side of said base plate 8 in a position opposing to said swiveling table 2 likewise so as to shift along said guide rail 9, and these swiveling table 2 and tailstock 3 are connected to each other through a connecting rod 10. When fixing of said tailstock 3 to said connecting rod 10 is released and said tailstock 3 is moved in X direction along said guide rail 9, the distance between said swiveling table 2 and said tailstock 3 can be freely adjusted. Further, a driving motor 12 is connected to said swiveling table 2 through a ball screw 11, and when said ball screw 11 is driven by means of said motor 12, said swiveling table 2 together with said tailstock 3 can be shifted in X direction along said guide rail 9.

Figure 4:
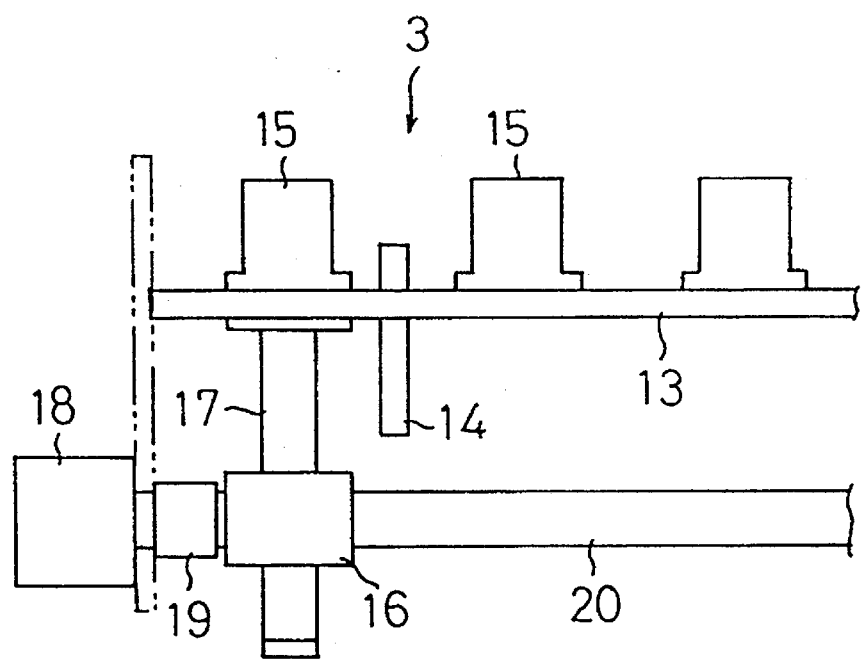
FIG. 4 is an enlarged front view of tailstock shown in FIG. 1.
Figure 5:
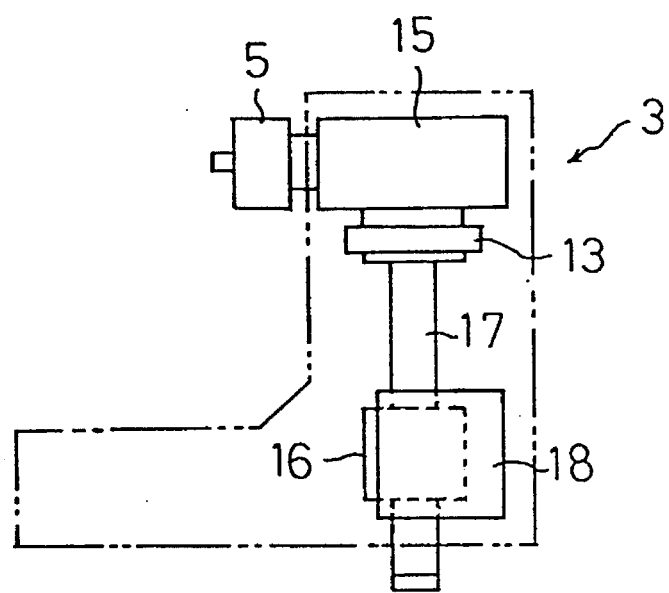
FIG. 5 is a side view of tailstock shown in FIG. 4.
Figure 6:
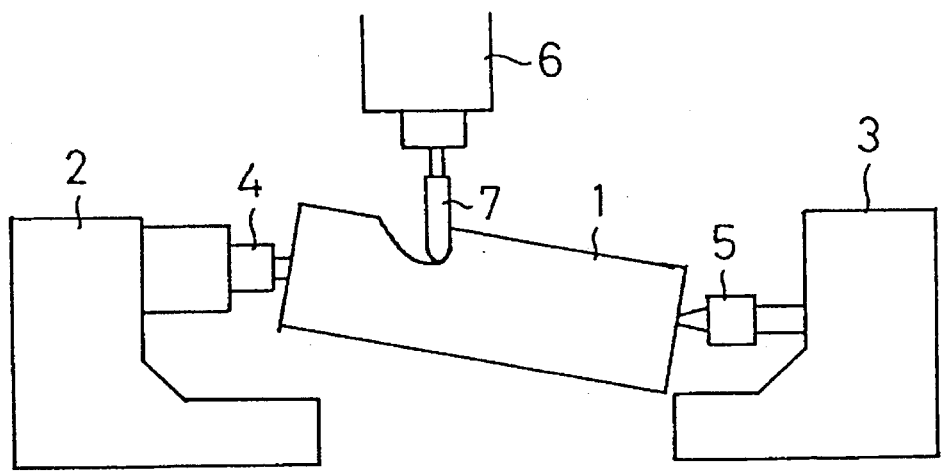
FIG. 6 is a diagram showing the tilting position of a work held by a tailstock according to the invention.
Figure 6:
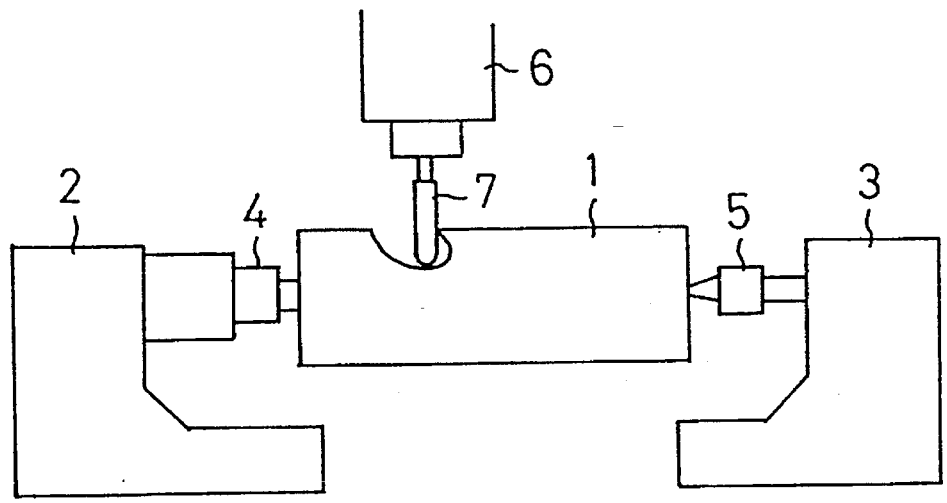

As shown in FIG. 4 to FIG. 6, said tailstock 3 has a horizontal elevating table 13, and an elevation guide 14 for guiding the elevation movement of said elevating table 13 is located in the vertical direction on one side of said elevating table 13. Tail heads 15 are located in respective positions on said elevating table 13 and opposing to respective jigs 4 of said swiveling table 2, and holders 5 are located on the front ends of respective tail heads 15, each holder 15 holding the corresponding work 1 while urging this work 1 against the opposing jig 4 of said swiveling table 2. Respective screw jacks 16 (one of which is shown) are located below respective ends of said elevating table 13, and each of said screw jacks 16 has an elevation shaft 17, the upper end of which is connected to the lower surface of said elevating table 13.

Further, a driving shaft 19 of a servo-motor 18 is connected to one of said screw jacks 16 on the one side, while a transmission shaft 20 is connected between said screw jack 16 on the one side and that on the other side for transmitting the rotation of said driving shaft 19 of said servomotor 18 to said screw jack 16 on the other side. Thus, when said servo-motor 18 is energized and drives said driving shaft 19 and therewith said transmission shaft 20, said respective elevation shafts 17 are vertically shifted through respective screw jacks 16 thereby to vertically shift said elevating tables 13. Therefore, works 1 can be held in tilting positions between said jigs 4 of said swiveling table 2 and said holders 5 of said tailstock 3 in this construction as shown in FIG. 6.

A carriage 21 is mounted above said base plate 8 in such a manner to shift left-to-right direction in FIG. 2 (Y direction), and elevating bed 22 is mounted on said carriage 21 in such a manner to shift vertically, i.e. in Z direction. The bottom end of said elevating bed 22 is provided with blade holders 6 at respective positions corresponding to said jigs 4, said blade holders 6 carrying respective cutting blades 7.

The control mechanism of woodworking machines according to the invention is described hereinbelow with reference to FIG. 7.

A numerical control (NC) copying digitizing device 24 is connected to a computer 23 such as personal computer, and said computer 23 outputs the working conditions calculated through computer-aided design (CAD) such as starting points and limits of digitizing operation into said NC copying digitizing device 24, while at the same time said computer 23 stores the digitizing data obtained by said NC copying digitizing device 24. Said NC copying digitizing device 24 traces the surface of a model to be worked by means of a copying head (not shown) from the starting points transferred from said computer 23 to said limits, thereby to pick up respective coordinates data in X, Y and Z directions for every specified pitch (for example, for every 1 mm) thereby to form digitizing data, which digitizing data are transferred to said computer 23.

A plurality of woodworking machines 25 having the construction as described above are connected to said computer 23, which controls rotation of said swivel table 2, shift of said swivel table 2 in X direction, shift of said carriage 21 in Y direction and shift of said elevating bed 22 in Z direction of respective woodworking machines 25.

The operation of woodworking machines according to the invention is described hereinbelow with reference to the flow charts shown in FIG. 7.

In the embodiment shown in these flow charts, working conditions such as starting points, limits and the like are first calculated by CAD function of computer 23, and these working conditions are output from computer 23 to said NC copying digitizing device 24. When a work 1 has a complicated form, a number of programs are necessary for working a single work 1, so that these programs corresponding to respective starting points are formed by said computer 23 and are given their respective program numbers. Further, said computer 23 forms a main program integrating these programs and a control file for data controlling of said main program and respective programs together.

When a copying digitizing starting command is output from said computer 23 to said NC copying digitizing device 24, the latter device 24 shifts the copying head to the specified starting points corresponding to said starting points data from said computer 23 to start NC copying digitizing operation, and digitizing data thus obtained are output to said computer 23.

The above described operation is repeated for every parts of said works 1, thereby to form a complete digitizing data of said works 1 corresponding to respective programs, and said complete digitizing data are stored in said computer 23, thus finishing the whole operation.

After the digitizing data is formed, respective works 1 are inserted between respective jigs 4 and corresponding holders 5 of said woodworking machines 25. When working operation is thus prepared, respective woodworking machines 25 are started and they send request signals for digitizing data to computer 23. Upon receiving said request signals, said computer 23 searches working programs on the basis of said control file preformed by computer 23 and sends specified programs to woodworking machines 25.

According to said programs, said jigs 4 of said swivel table 2 are rotated while said swivel table 2 is driven thereby to shift said works 1 in X direction. At the same time, said carriage 21 and said elevating bed 22 are driven thereby to shift said cutting device 13 both in Y direction and in Z direction. Thus, said cutting device 6 carries out the working of said works 1.

In the construction of the woodworking machines 25 according to the invention, works 1 are cut by means of said cutting tools 6 by rotating said jigs 4 of said swiveling table 2 while shifting said swiveling table 2 and said works 1 in X direction and simultaneously driving said shifting stock 21 and said elevating stock 22 thereby to shift said cutting tools 6 in Y and Z directions, and if necessary, by driving said servo-motor 18 thereby to vertically shift said elevating table 13 and tilt said works 1.

Said computer 23 monitors any request signals from other woodworking machines 25 in a multitask manner, and upon receiving any request signals, said computer 23 searches required programs and transfers digitizing data to the requesting woodworking machines 25, thereby to carry out an online working. In this manner, working operation of a plurality of woodworking machines 25 on the one hand and forming operation of digitizing data on the other hand can be carried out simultaneously.

Accordingly, since said works 1 can be held in tilted positions due to the vertical movements of said elevating tables 13 according to the invention, said cutting tools can reach the interior portion of a cave to be worked in said works, so that a suitable working of cave can be achieved. Further, since the construction according to the invention does not comprise tilting of rotating axis of jigs 4, decrease of rigidity around the axis of jigs 4 is prevented while at the same time preventing any complicated mechanism.

While the present invention has been described with reference to exemplary embodiment thereof, it will be appreciated by those skilled in the art that variations and modifications may be made thereto without departing from the spirit of the inventive concepts disclosed herein.

What is claimed is:

1. Woodworking apparatus comprising:
   a. a base plate;
   b. a longitudinally movable table mounted on said baseplate;
   c. a plurality of parallel rotatable jigs mounted on said table;
   d. a tailstock mounted on said baseplate, longitudinally spaced from said table and movable along a longitudinally extending rail of said baseplate on which said movable table also resides, comprising:
      i. a vertically movable second table;
      ii. a plurality of parallel holders mounted on said second table and being vertically movable therewith, spaced from and facing said corresponding ones of said jigs;
      iii. means for moving said second table vertically, comprising:
         (1) a servomotor having a horizontal output shaft;
         (2) a screwjack mounted on said output shaft and rotatably driven thereby;
         (3) an elevating shaft supporting said second table and being driven vertically by said screwjack upon rotation of said servomotor output shaft;
      iv. a carriage supporting said second table and being movable transversely respecting said baseplate;
   e. said holders being adapted to cooperate with corresponding jigs to retain workpieces therebetween;
   f. a plurality of transversely and vertically movable cutting tools positioned above corresponding spaces between said jigs and said holders in which said workpieces are retained;
   g. a computer for providing working conditions such as start points and limits of digitizing operation and storing digitizing data received from a digitizing device for use in defining movement of said cutting tools and said second table;
   h. said numerical control copying and digitizing device for tracing the surface of a model to be reproduced from a workpiece by operation of said cutting tools and said second table to create x,y and z coordinate data representative of said traced model surface and providing said x,y and z coordinate data representative of said traced model surface in digital form to said computer for use thereby in defining movement of said cutting tools and said second table to reproduce said model from a workpiece.

2. Apparatus of claim 1 further comprising connecting rod means for releasably retaining said table and said tailstock at a fixed distance from one another.

3. Apparatus of claim 2 further comprising:
   a. a drive motor;
   b. ball screw means connected to said motor for moving said table and said tailstock longitudinally along said common mounting rail.

4. Woodworking apparatus comprising:
   a. a computer for providing working conditions such as start points and limits of digitizing operation and storing digitizing data received from a digitizing device for use in defining movement of cutting tools and second tables of a plurality of woodworking machines;
   b. a numerical control copying and digitizing device for tracing the surface of a model to be reproduced from workpieces by operation of said cutting tools and said second tables of said plurality of woodworking machines to create x,y and z coordinate data representative of said traced model surface and providing said x,y and z coordinate data representative of said traced model surface in digital form to said computer for use thereby in defining movement of said cutting tools and said second tables of said plurality of woodworking machines to reproduce a plurality of said models from a plurality of workpieces; and
   c. said woodworking machines of said plurality each comprising:
      i. a base plate;
      ii. a longitudinally movable table mounted on said baseplate;
      iii. a plurality of parallel rotatable jigs mounted on said table;
      iv. a tailstock mounted on said baseplate, longitudinally spaced from said table and movable along a longitudinally extending rail of said baseplate on which said movable table also resides, comprising:
      v. a vertically movable second table;
      vi. a plurality of parallel holders mounted on said second table and being vertically movable therewith, spaced from and facing said corresponding ones of said jigs;
      vii. means for moving said second table vertically, comprising:
         (1) a servomotor having a horizontal output shaft;
         (2) a screwjack mounted on said output shaft and rotatably driven thereby;
         (3) an elevating shaft supporting said second table and being driven vertically by said screwjack upon rotation of said servomotor output shaft;
      viii. a carriage supporting said second table and being movable transversely respecting said baseplate;
      ix. said holders being adapted to cooperate with corresponding jigs to retain workpieces therebetween; and
      x. a plurality of transversely and vertically movable cutting tools positioned above corresponding spaces between said jigs and said holders in which said workpieces are retained.

* * * * *